United States Patent [19]

Lewarchik et al.

[11] Patent Number: 4,560,728

[45] Date of Patent: Dec. 24, 1985

[54] THERMALLY CURED TOPCOATS ON VACUUM DEPOSITED METAL

[75] Inventors: Ronald J. Lewarchik, Arlington Heights, Ill.; Jeffrey W. Thompson, Centerville, Ohio

[73] Assignee: DeSoto, Inc., Des Plaines, Ill.

[21] Appl. No.: 537,694

[22] Filed: Sep. 30, 1983

[51] Int. Cl.$^4$ .................................................. C09D 3/72
[52] U.S. Cl. .................................. 525/123; 525/326.9; 525/328.2; 525/374; 525/375
[58] Field of Search .................. 428/424.2, 461; 525/123, 326.9, 328.2, 374, 375

[56] References Cited

U.S. PATENT DOCUMENTS 3,681,289  8/1972  Kruse et al. .................... 525/123

FOREIGN PATENT DOCUMENTS 4061234  5/1979  Japan .................................. 525/123

Primary Examiner—John Kight
Assistant Examiner—Kriellion Morgan
Attorney, Agent, or Firm—Dressler, Goldsmith, Shore, Sutker & Milnamow, Ltd.

[57] ABSTRACT

A coating composition adapted to adhere to a chrome surface is disclosed in which a solvent soluble hydroxy-functional acrylic copolymer, including a copolymerized tertiary amine monomer in an amount of from 5% to 40% of the weight of the copolymer, is combined with an organic polyisocyanate curing agent for the soluble copolymer, this composition containing the copolymer and the polyisocyanate curing agent in amounts to provide an equivalent ratio of NCO:OH of from 1.2:1 to 0.5:1. The two components are provided as a two package system which is mixed prior to application.

15 Claims, No Drawings

4,560,728

THERMALLY CURED TOPCOATS ON VACUUM DEPOSITED METAL

TECHNICAL FIELD

This invention relates to the overcoating of the chrome layer which is deposited on various surfaces by vacuum metalization or by sputtering. These chrome deposits provide an attractive metallic appearance, but this attractive appearance must be protected against abrasion and moisture, as is encountered on exterior exposure. Also, the overcoating must be mar-resistant and be strongly adherent to the chrome surface, and this presents a formidable problem.

BACKGROUND ART

It is known to overcoat the chrome layer which has been described using a two package system in which an hydroxy-functional polymer is combined with an organic polyisocyanate. This is an unstable system in which the two components react together to form a polyurethane coating. Unfortunately, adhesion to the chrome surface is poor even though isocyanate-curing systems are normally characterized by good adhesion to many substrates. This adverse experience serves to illustrate the difficulty of adhering coatings to chrome surfaces.

DISCLOSURE OF INVENTION

In this invention, it has been found that an hydroxy-functional acrylic copolymer including a copolymerized tertiary amine monomer, preferably N-vinyl pyrrolidone, in an amount of from 5% to 40%, preferably from 10% to 30%, of the weight of the copolymer, can be overcoated onto a chrome surface and will be strongly adherent thereto when cured with an organic polyisocyanate. The mechanism by which the amine-functional monomer functions to provide this marked improvement in adhesion is not fully understood.

The result is a new two-package system in which each package is usually a solvent solution. The first package contains the hydroxy-functional copolymer, and the second package contains the organic polyisocyanate curing agent.

The hydroxy-functional copolymers which are used herein in the first package are soluble copolymers preferably provided by solution copolymerization of monoethylenically unsaturated monomers consisting essentially of: 1- the previously set forth weight proportion of monoethylenically unsaturated amine-functional monomer; 2- from 5% to 25%, preferably from 8% to 20%, of hydroxy-functional monomer; and 3- the balance being monomers having a single ethylenic group as the sole reactive group in the monomer.

The monomers having a single ethylenically unsaturated group as the sole reactive group in the monomer serve to limit the cross-link density of the final copolymer. After one has accounted for the hydroxy-functional monomer and the amine-functional monomer, the monomers under consideration constitute the bulk of the remainder of the polymer. Monomers of this type are illustrated by $C_1$ to $C_8$ alkyl esters of acrylic or methacrylic acids, such as isobutyl acrylate or methyl methacrylate, though other monoethylenic acids, like crotonic acid or maleic acid can also be esterified with the same alcohols to provide esters useful herein, like dibutyl maleate. Styrene, vinyl toluene, vinyl acetate and acrylonitrile will further illustrate this class of monomers.

The hydroxy-functional monomers may be constituted by any monoethylenic monomer carrying one or more hydroxy groups as the sole reactive group other than the single ethylenic group. These monomers are illustrated by 2-hydroxypropyl acrylate or methacrylate, but other hydroxyalkyl esters of monoethylenic carboxylic acids are also useful, especially $C_2$ to $C_4$ hydroxyalkyl esters, such as 2-hydroxyethyl methacrylate or crotonate. Other useful hydroxy-functional monomers are illustrated by allyl alcohol or methallyl alcohol. Hydrolyzed glycidyl methacrylate is also useful. The hydroxy monomer provides hydroxy functionality to enable cure with the organic polyisocyanate component of the coating compositions of this invention.

Hydroxypropyl acrylate or methacrylate yield superior humidity resistance, and this is a feature of this invention.

The tertiary amine-functional monomers are preferably illustrated by N-vinyl pyrrolidone, but other tertiary amine-functional monomers are also useful, such as dimethyl aminoethyl acrylate or methacrylate. Dimethyl aminopropyl acrylate or methacrylate, and also the corresponding acrylamides and methacrylamides, like dimethyl aminoethyl methacrylamide, may also be used.

Up to about 5% of the copolymer may be constituted by other monoethylenic monomers, such as monoethylenic carboxylic acids illustrated by acrylic and methacrylic acids, but these are of secondary importance.

The second package of the two package coating compositions of this invention is provided by an organic polyisocyanate curing agent for the hydroxy-functional copolymer, the polyisocyanate being usually employed in water-free solvent solution. This second package is mixed with the first package in an amount to provide a mixture of polyisocyanate and copolymer having an equivalent ratio of NCO:OH of from 1.2:1 to 0.5:1.

As will be understood, the two components of the composition are mixed together to provide an unstable mixture which possesses sufficient stability to allow it to be applied and used successfully. Thus, a relatively stable mixture having several hours of useful life is formed and maintained until it is applied.

All proportions herein and in the accompanying claims are by weight, unless otherwise specified.

The coatings of this invention are typically deposited on the substrate in a thickness of from 0.7 to 1.5 mils, preferablyi about 1.0 mil. Application can be made in any convenient manner, preferably by spraying the mixture of copolymer and polyisocyanate curing agent on the chrome surface to be protected as an organic solvent solution which has been thinned to spray viscosity. One may use air spray, airless spray or electrostatic spray techniques.

A typical solution of spray viscosity will have a pot life of about 8 hours.

The reaction between the hydroxy groups of the copolymer and the isocyanate groups of the polyisocyanate curing agent proceeds well when the two packages are mixed together at low temperature, and can even be carried out at normal room temperature. The reaction is itself well known, and typical catalysts for speeding the reaction are also well known and may be present, as shown in the examples. It is preferred, however, to speed the cure by baking the coated substrate at 165° F. for about 30 minutes. At that temperature, the cure time will vary (depending upon what composition is selected) from about 15 minutes to about 90 minutes.

It will be understood that the substrates are usually thermoplastic moldings which are damaged when the curing temperature is excessive. This is why it is important to be able to cure the coatings at a temperature of only about 165° F. within a reasonable period of time.

While chrome surfaces are particularly contemplated, the invention is also applicable to chromium alloys, to aluminum, aluminum alloys, and to the other metals which can be vapor deposited or plated in thin layers, or provided in thin strips.

EXAMPLE 1

A first package is made by mixing 44.43 parts of a solution copolymer of 35.5% methyl methacrylate, 31.5% of 2-ethylhexyl acrylate, 12.0% of 2-hydroxypropyl methacrylate, 20.0% of N-vinyl pyrrolidone and 1.0% of acrylic acid in solution at 50% solids in methyl n-amyl ketone, with 1.46 parts of a 1% butyl acetate solution of dibutyl tin dilaurate catalyst, 2.44 parts of a hindered amine light stabilizer in 10% xylene solution (Ciba Geigy product CGL 292 can be used) and 2.44 parts of a substituted hydroxyphenyl benzotriazole ultraviolet light absorber in 10% xylene solution (Ciba Geigy product CGL 900 can be used). This package is stable.

A second package is made by mixing 2.35 parts of a triisocyanate-functional isocyanurate in 90% solids solution in 2-ethoxy ethanol acetate with 40.51 parts of toluene and 6.37 parts of a 1% xylene solution of polymethyl polysiloxane.

When these two packages are mixed (by simply stirring the two solutions together), the product is a solution of spray viscosity which has an NCO/OH ratio of 0.6:1.0. This solution is sprayed (to provide a wet coating having a thickness of about 1 mil) on a chrome surface formed by vapor-deposition on a thermoplastic molding, and the coated molding is cured in an oven maintained at 165° F. for 30 minutes. The coating adheres excellently and resists weathering and impact.

EXAMPLE 2

Example 1 is repeated using a copolymer of 35.5% methyl methacrylate, 31.5% of 2-ethylhexyl acrylate, 12% 2-hydroxypropyl methacrylate and 20% N-vinyl pyrrolidone. Corresponding results are obtained.

EXAMPLE 3

Example 1 is repeated using a copolymer in which the 20% of N-vinyl pyrrolidone is replaced by 20% of dimethyl aminoethyl methacrylate. Corresponding results are obtained.

EXAMPLE 4

Example 1 is repeated using a corresponding equivalent proportion of a trifunctional isocyanate prepolymer made by reacting hexamethylene diisocyanate with water to form a biuret in place of the polyisocyanate used in Example 1. Corresponding results are obtained.

What is claimed is:

1. A coating composition adapted to adhere to a chrome surface comprising, a solvent soluble hydroxy-functional acrylic copolymer including a copolymerized tertiary amine monomer in an amount of from 10% to 40% of the weight of the copolymer, and an organic polyisocyanate curing agent for said soluble copolymer, said composition containing said copolymer and said polyisocyanate curing agent in amounts to provide an equivalent ratio of NCO:OH of from 1.2:1 to 0.5:1.

2. A coating composition as recited in claim 1 in which said copolymer is produced by solution copolymerization.

3. A coating composition as recited in claim 1 in which said amine-functional monomer is N-vinyl pyrrolidone.

4. A coating composition as recited in claim 1 in which said amine monomer is present in an amount up to 30%.

5. A coating composition as recited in claim 1 in which said hydroxy functionality is provided by an hydroxy-functional monomer present in an amount of from 5% to 25%.

6. A coating composition as recited in claim 5 in which said hydroxy monomer is present in an amount of from 8% to 20%.

7. A coating composition as recited in claim 1 in which said hydroxy monomer is a $C_2$ to $C_4$ alkyl ester of a monoethylenically unsaturated monocarboxylic acid.

8. A coating composition as recited in claim 6 in which said hydroxy monomer is 2-hydroxypropyl acrylate.

9. A coating composition as recited in claim 1 in which said copolymer further includes up to 5% of a monoethylenic carboxylic acid.

10. A thermoplastic substrate having a metal film deposited thereon, said film being topcoated with a clear cured coating of the coating composition of claim 1.

11. The combination of claim 10 in which said metal film is a chrome film.

12. A two package coating system adapted to form a mixture which deposits coatings which cure upon and adhere to a chrome surface comprising, a first package which is an organic solvent solution of solvent soluble hydroxy-functional acrylic copolymer including a copolymerized tertiary amine monomer in an amount of from 10% to 40% of the weight of the copolymer, and a second package which is a water-free organic solvent solution of an organic polyisocyanate curing agent for said soluble copolymer, said two packages containing said copolymer and said polyisocyanate curing agent in amounts to provide an equivalent ratio of NCO:OH of from 1.2:1 to 0.5:1.

13. A two package system as recited in claim 12 in which said copolymer is formed by solution polymerization of monoethylenically unsaturated monomers consisting essentially of: 1- from 10% to 30% of N-methyl pyrrolidone; 2- from 5% to 25% of hydroxy-functional monomer; and 3- the balance of the copolymer being monomers having a single ethylenic group as the sole reactive group therein.

14. A two package system as recited in claim 13 in which said hydroxy monomer is a $C_2$ to $C_4$ alkyl ester of a monoethylenically unsaturated monocarboxylic acid present in an amount of from 8% to 20%, and said copolymer further includes up to 5% of a monoethylenically unsaturated carboxylic acid.

15. A two package system as recited in claim 14 in which said polyisocyanate is trifunctional.

* * * * *